United States Patent [19]

Torii et al.

[11] 4,177,307

[45] Dec. 4, 1979

[54] THERMAL SHOCK RESISTANT CERAMIC HONEYCOMB STRUCTURES

[75] Inventors: Yukio Torii, Mons, Belgium; Takao Nakamura, Nagoya, Japan

[73] Assignee: NGK Insulators, Ltd., Nagoya, Japan

[21] Appl. No.: 883,948

[22] Filed: Mar. 6, 1978

[30] Foreign Application Priority Data

Mar. 12, 1977 [JP] Japan .................................. 52-27173

[51] Int. Cl.$^2$ .............................................. B32B 3/12
[52] U.S. Cl. .................................................... 428/116
[58] Field of Search ........................................ 428/116

[56] References Cited

U.S. PATENT DOCUMENTS

| | | | |
|---|---|---|---|
| 3,824,196 | 7/1974 | Benbow et al. ................ | 252/455 R |
| 3,885,977 | 5/1975 | Lachman et al. .................... | 428/116 |
| 3,887,741 | 6/1975 | Dwyer ................................. | 428/116 |
| 3,899,326 | 8/1975 | Frost et al. ......................... | 428/116 |
| 3,903,341 | 3/1978 | Gerhold ............................... | 423/116 |
| 3,958,058 | 5/1976 | Elmer ................................... | 428/220 |
| 4,042,738 | 8/1977 | Gulati ................................. | 428/116 |

FOREIGN PATENT DOCUMENTS 52-119611 10/1977 Japan .

OTHER PUBLICATIONS

Gulati, "Effect of Cell Geometry on Thermal Shock Resistance of Catalytic Monoliths", Society of Automotive Engineers, Feb. 1975, #750171.

Fukuda et al., "Comparison of Automotive Catalytic Honeycomb Structures Through Two-Dimensional Thermal Stress Analysis", Society of Automotive Engineers, Oct. 1975, #750872.

*Primary Examiner*—William R. Dixon, Jr.
*Attorney, Agent, or Firm*—Stevens, Davis, Miller & Mosher

[57] ABSTRACT

Thermal shock resistant ceramic honeycomb structures in which the shape of the vertical cross-section of the honeycomb structure is elliptical, and the shape of the channels is quadrilateral, one group of the partitions of the channels being inclined against the long diameter direction of the ellipse-shaped honeycomb structure and another group of the partitions of the channels being parallel to or inclined against the short diameter direction, the two groups of partitions are being crossed to form the quadrilateral channels.

7 Claims, 22 Drawing Figures

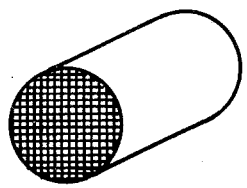
FIG.1A
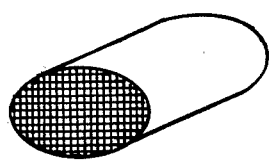
FIG.1B
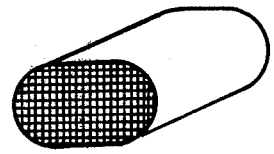
FIG.1C
FIG.2A
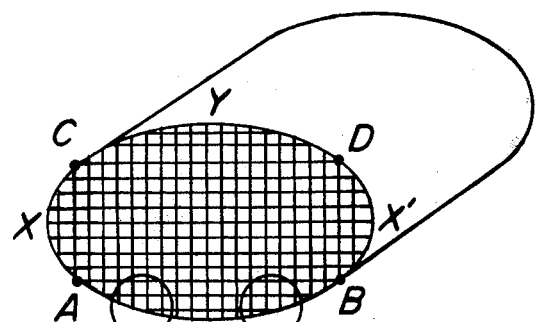
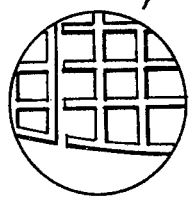
FIG.2C
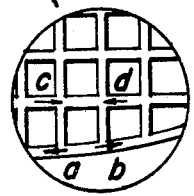
FIG.2B FIG._7A
FIG.7B
FIG.7C
FIG.7D
FIG._7E
FIG.7F
FIG.7G
FIG._7H
FIG._7I
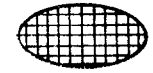
FIG.7J
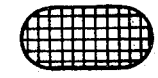
FIG.7K
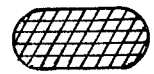

THERMAL SHOCK RESISTANT CERAMIC HONEYCOMB STRUCTURES

The present invention relates to ceramic honeycomb structures having a high thermal shock resistance.

Recently, catalytic converters have been used for purifying exhaust gas discharged from internal combustion engines in order to prevent pollution of air.

The catalyst to be used for the catalytic converters are ones obtained by carrying a noble metal on ceramic pellet supports or a ceramic honeycomb substrate. While the honeycomb-shaped catalyst is smaller in pressure loss of the catalyst bed, better in warm up ability and higher in abrasion resistance than the pellet-shaped catalyst, it has problems of thermal shock resistance owing to quick heating and quenching.

Accordingly, in order to increase the thermal shock resistance of the honeycomb-shaped catalyst, it has been proposed that the thermal expansion coefficient of the ceramic honeycomb substrate be lowered and that the mechanical strength increased. At present the honeycomb-shaped catalyst using the ceramic honeycomb substrate composed of cordierite ($2MgO.2Al_2O_3.5SiO_2$) having a low thermal expansion coefficient has been practically used.

The catalytic converter using the honeycomb-shaped catalyst has been constituted as follows. In general, a cordierite ceramic honeycomb is coated with an active substance, such as $\gamma$-alumina having a large specific surface area, and a noble metal, such as platinum, palladium, rubidium, etc. is deposited on the $\gamma$-alumina layer to form a honeycomb-shaped catalyst and the thus formed honeycomb-shaped catalyst is housed in a can composed of, for example, stainless steel and is arranged at a passageway of exhaust gas discharged from an internal combustion engine. Hydrocarbons, carbon monoxide, nitrogen oxides in the exhaust gas are oxidized or reduced by the honeycomb-shaped catalyst bed to purify the exhaust gas.

In this case, the honeycomb-shaped catalyst is generally rapidly heated to about 600° C. to 800° C. in a time from dozens of seconds to several minutes owing to heating with exhaust gas and heat emission due to the catalytic reaction and is quenched to approximately room temperature when the internal combustion engine is stopped.

Accordingly, the ceramic honeycomb structure to be used for the honeycomb-shaped catalyst must endure this elevation of temperature or lowering of temperature and particularly when the temperature is raised, a temperature gradient in which the temperature at the center portion of the honeycomb catalyst is higher and the temperature at the outer periphery portion is lower occurs, so that a tensile stress is caused at the outer periphery portion. When the temperature difference exceeds the thermal shock resistant temperature of the ceramic honeycomb structure, cracks are formed from the outer periphery and the honeycomb structure is broken.

For a better understanding of the invention, reference is taken to the accompanying drawings, wherein:

FIGS. 1A, 1B, and 1C are explanatory perspective views showing schematically cross-sections of conventional ceramic honeycomb structures;

FIG. 2A is an explanatory perspective view showing schematically a cross-section of a conventional ceramic honeycomb structure, FIG. 2B is a view explaining generation of stress due to a thermal shock, and FIG. 2C shows a view explaining the status of forming cracks;

Figure 4:
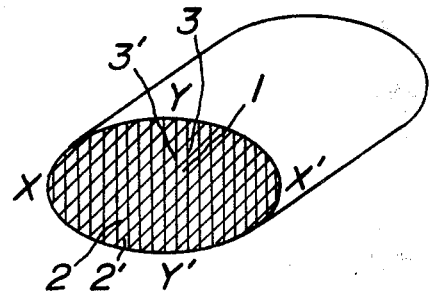
Figure 5:
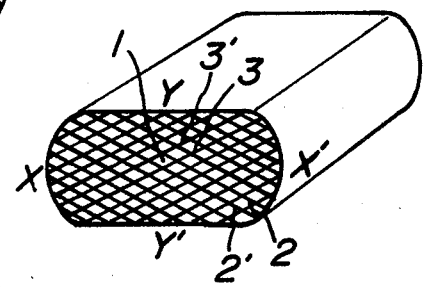
Figure 6:
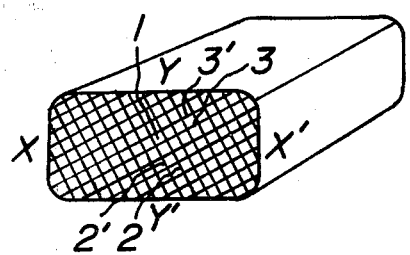

FIGS. 4, 5 and 6 are perspective views showing schematically the other embodiments of the present invention; and FIGS. 7A–7H show views showing the outer periphery shapes and the arrangement of the channels of the honeycomb structures of the present invention, FIGS. 7I–7J show views showing the outer periphery shapes and the arrangement of the channels of the conventional honeycomb structures and FIG. 7K shows a view showing the outer periphery shape and the arrangement of the channels as a reference honeycomb structure.

The ceramic honeycomb structure as shown in FIG. 1A which has been heretofore generally used for the catalytic converter and in which the shape of a multiplicity of channels extending parallel with one another is square and the outer periphery is circular, has been relatively few in formation of cracks due to the above described thermal shock but since the regulation of the exhaust gas of automobile has been recently tightened and the volume of the catalytic converter become larger, ellipse-shaped ceramic honeycombs, such as the oval or race track shape as shown in FIGS. 1B and 1C have been demanded in view of the height of automobile to be provided with the catalytic converter but the ceramic honeycomb structures having these shapes are weak against the thermal shock.

That is, in the ceramic honeycombs having the outer periphery shape of ellipse, as shown in FIG. 2A, the shape of a multiplicity of channels extending in parallel with one another is square and one of two groups of partitions crossed at right angles is parallel to the long diameter XX' of the ellipse and another partition is parallel to the short diameter YY' of the ellipse. When such a honeycomb structure is used as the catalytic converter and the temperature gradient wherein the temperature at the center portion is higher and the temperature at the outer periphery portion is lower is given, for example, in FIG. 2B, a tensile stress is applied to the outer wall $\overline{ab}$ and a compression stress is applied to a partition $\overline{cd}$ which opposes to the outer wall $\overline{ab}$, positions in the inside and is substantially parallel to the outer wall $\overline{ab}$, that is parallel to the long diameter XX' axis. Ceramics are very small in deformation against compression stress in view of the material characteristic and the stress relief due to the deformation hardly occurs, so that in the ceramic honeycomb structure wherein the partition $\overline{cd}$ is parallel to the direction of XX' axis, when the thermal stress becomes higher due to the temperature gradient, cracks are formed from the outer wall $\overline{ab}$ portion where the tensile stress is applied and if cracks are formed at the wall $\overline{ab}$, the tensile stress is subsequently applied to the partition $\overline{cd}$ and cracks are formed at the partition $\overline{cd}$ and in this manner, cracks are formed in turn and crack breakage as shown in FIG. 2C is liable to be caused.

Furthermore, in the ellipse-shaped ceramic honeycomb structure, the size difference of the long diameter and the short diameter is large and if an explanation is made with respect to FIG. 2A, the tensile stress applied to the outer walls $\stackrel{\frown}{AB}$ and $\stackrel{\frown}{CD}$ corresponding respectively to the paritions $\overline{AB}$ and $\overline{CD}$ parallel to the long diameter XX' is far larger than the tensile stress applied to the outer walls $\stackrel{\frown}{AC}$ and $\stackrel{\frown}{BD}$ corresponding respectively to the partitions $\overline{AC}$ and $\overline{BD}$ parallel to the short diameter YY' and the crack breakage is apt to accumulate and occur at the outer wall portions $\stackrel{\frown}{AB}$ and $\stackrel{\frown}{CD}$.

The thermal shock resistant ceramic honeycomb structures according to the present invention obviate these drawbacks of the conventional ceramic honeycomb structures, are very few in the crack breakage due to the thermal shock and have an excellent thermal shock resistance.

In such ceramic honeycomb structures, the shape of a multiplicity of channels extending parallel with one another is quadrilateral and the outer periphery shape of the vertical cross-section of said channels is ellipse. One of two groups of parallel partitions forming the quadrilateral channels has an inclined relation against the long diameter direction of the ellipse outer periphery shape and the other group of partitions are parallel to or inclined to the short diameter direction of the ellipse outer periphery shape and the above described two groups of continuous and parallel partitions are crossed with each other to form quadrilateral channels.

The more detailed constitution of the present invention will be explained with respect to an example shown in FIG. 3.

Figure 3A:
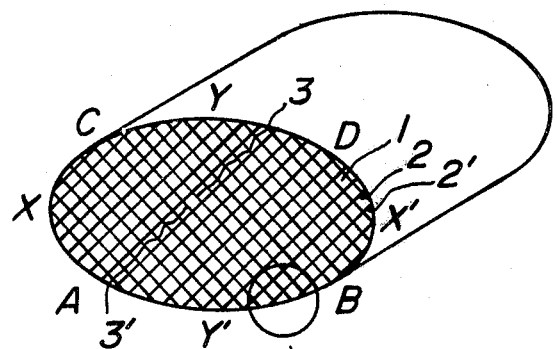
FIG. 3A is an explanatory perspective view showing schematically cross-section of an embodiment of the ceramic honeycomb structure of the present invention and FIG. 3B is a view explaining generation of stress due to the thermal shock.

One group of parallel partitions 2, 2' among two groups of parallel partitions 2, 2' and 3, 3' forming a multiplicity of quadrilateral channels 1 extending in parallel with one another have an inclined angle of preferably more than 10°, more particularly about 45°±15° against the long diameter direction XX' of the ellipse shape of the ceramic honeycomb structure and another parallel partitions 3, 3' are parallel to the short diameter direction YY' of the above described ellipse shape as shown in FIG. 4 or have an inclined angle of preferably more than 10°, more particularly about 45°±15° against the short diameter direction YY' as shown in FIGS. 3, 5 and 6 and the two groups of partitions 2, 2' and 3, 3' are crossed with one another to form quadrilateral channels.

Figure 3B:
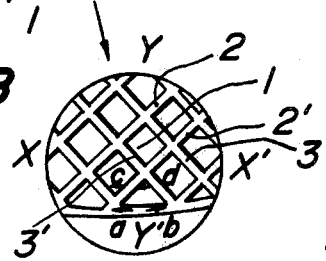

In the ceramic honeycomb structures according to the present invention it is essential that one group of partitions 2, 2' be inclined against the long diameter direction XX' of the ellipse and this is explained based on FIG. 3B. The partition $\overline{cd}$ has an inclined angle of preferably more than 10° against the outer wall $\overline{ab}$ substantially parallel to the long diameter XX' and the tensile stress is applied on the outer wall $\overline{ab}$ owing to the temperature gradient wherein the temperature at the center portion of the ceramic honeycomb structure is higher and the temperature at the outer periphery portion is lower, the bending stress is applied to the partition $\overline{cd}$. Ceramics more or less deform against the bending stress in view of the material characteristic and the tensile stress applied to the outer wall $\overline{ab}$ is relieved by this deformation. In the ellipse-shaped ceramic honeycomb structure, as mentioned above, the tensile stress applied to the outer walls $\stackrel{\frown}{AB}$ and $\stackrel{\frown}{CD}$ of the long diameter direction is larger than the tensile stress applied to the outer walls $\stackrel{\frown}{AC}$ and $\stackrel{\frown}{BD}$ of the short diameter direction, but in the ceramic honeycomb structure of the present invention, the partition is necessarily inclined against the long diameter direction and by this means, the high tensile stress applied to the outer walls $\stackrel{\frown}{AB}$ and $\stackrel{\frown}{CD}$ of the long diameter direction is relieved as mentioned above. It has been found by a large number of investigations that the ellipse-shaped ceramic honeycomb structures having a very high thermal shock resistance can be obtained.

As the shape of the most preferable ceramic honeycomb structure of the present invention, as shown in FIG. 3, one group of the partitions 2, 2' are inclined in an angle of about 45° against the long diameter direction XX' and another group of partitions 3, 3' are inclined in about 45° against the short diameter direction.

The shape of the channel of the ceramic honeycomb structure of the present invention is not limited to square but shows the quite similar effect in rectangle and rhombus.

The term "ellipse" of the outer periphery shape used herein means oval, race track-shape and a combined shape of straight lines and arcs and these shapes attain the similar effect. Moroever, in rectangle which is the limit of the race track-shape, substantially the same effect is recognized.

The ceramic honeycomb structures of the present invention are fewer in the crack formation at the outer wall of the long diameter direction due to drying and firing than the conventional ceramic honeycomb structures upon production based on the same theory and the yield is noticeably improved.

The invention will be explained in more detail.

The following examples are given for the purpose of illustration of this invention and are not intended as limitations thereof.

In cordierite ceramic honeycomb structures having quadrilateral channels wherein the length of one side of the channel is 1.5 mm. The thickness of the partition is 0.28 mm, the short diameter and the long diameter of the ellipse are 64 mm and 127 mm respectively and the length of the honeycomb structure is 76 mm, the inclined angle of the two groups of parallel partitions against the long diameter and the short diameter were varied as shown in the following Table 1 to prepare the honeycomb structure samples. These samples were placed in an electric heating furnace heated at a given temperature of 800° C. to 1,000° C. and after 15 minutes, the samples were taken out into air at room temperature and tensile stress due to quenching was applied to the outer wall portion and the status of formation of cracks was observed. The results are shown in the following Table 1.

As seen from Table 1, the ceramic honeycomb structures of the present invention are from 50° C. to 150° C. higher in the thermal shock resistant temperature than the ceramic honeycomb structures having the conventional configuration and the thermal shock resistance is excellent.

Table 1(a)

| Sample No. | Outer periphery shape | Angle of partition against long diameter | Angle of partition against short diameter | Temperature in electric furnace | | | | |
|---|---|---|---|---|---|---|---|---|
| | | | | 800° C. | 850° C. | 900° C. | 950° C. | 1,000° C. |
| 1 | Present | | | Not forming | Not forming | Not forming | Not forming | Formed |

Table 1(a)-continued

| Sample No. | | Outer periphery shape | Angle of partition against long diameter | Angle of partition against short diameter | Temperature in electric furnace | | | | |
|---|---|---|---|---|---|---|---|---|---|
| | | | | | 800° C. | 850° C. | 900° C. | 950° C. | 1,000° C. |
| 1 (FIG. 7A) | Present invention | Oval | 45° | 45° | crack | crack | crack | crack | cracks |
| 2 (FIG. 7B) | Present invention | Oval | 30° | 60° | Not forming crack | Not forming crack | Not forming crack | Formed cracks | — |
| 3 (FIG. 7C) | Present invention | Oval | 30° | zero degrees | Not forming crack | Not forming crack | Not forming crack | Formed cracks | — |
| 4 (FIG. 7D) | Present invention | Race track | 45° | 45° | Not forming crack | Not forming crack | Not forming crack | Not forming crack | Formed cracks |
| 5 (FIG. 7E) | Present invention | Race track | 20° | zero degrees | Not forming crack | Not forming crack | Formed cracks | — | — |
| 6 (FIG. 7F) | Present invention | Race track | 10° | 20° | Not forming crack | Not forming crack | Formed cracks | — | — |

Table 1 (b)

| Sample No. | | Outer periphery shape | Angle of partition against long diameter | Angle of partition against short diameter | Temperature in electric furnace | | | | |
|---|---|---|---|---|---|---|---|---|---|
| | | | | | 800° C. | 850° C. | 900° C. | 950° C. | 1,000° C. |
| 7 (FIG. 7G) | Present invention | Modified race track | 45° | 45° | Not forming crack | Not forming crack | Not forming crack | Not forming crack | Formed cracks |
| 8 (FIG. 7H) | Present invention | Modified race track | 30° | 60° | Not forming crack | Not forming crack | Not forming crack | Formed cracks | — |
| 9 (FIG. 7I) | Conventional | Oval | Parallel | zero degrees | Not forming crack | Formed cracks | — | — | — |
| 10 (FIG. 7J) | Conventional | Race track | Parallel | zero degrees | Not forming crack | Formed cracks | — | — | — |
| 11 (FIG. 7K) | Reference | Race track | Parallel | 30° | Not forming crack | Formed cracks | — | — | — |

As mentioned above, the ceramic honeycomb structures according to the present invention are noticeably superior in the thermal shock resistance to the honeycomb structures heretofore used and are the practically useful ellipse-shaped catalyst supports and can be particularly used for the catalyst converter for purifying the exhaust gas discharged from the internal combustion engine and are very useful in preventing of air pollution.

What is claimed is:

1. Thermal shock resistant ceramic honeycomb structures in which the shape of a multiplicity of parallel channels extending therethrough is quadrilateral and the outer periphery shape of the vertical cross-section of said honeycomb is an ellipse having an X-axis along its long diameter and a Y-axis along its short diameter, the honeycomb having first and second groups of parallel partitions forming the quadrilateral channel, said first group of partitions being inclined at an angle of more than 10° against the X-axis, said second group of partitions being parallel to or inclined against the Y-axis.

2. The ceramic honeycomb structures as claimed in claim 1, wherein the channels are square, rectangular or rhombus.

3. The ceramic honeycomb structures as claimed in claim 1, wherein the outer periphery shape of the honeycomb structure is ellipse, oval or race track-shape constituted with a combination of straight lines and arcs.

4. The ceramic honeycomb structures as claimed in claim 1, wherein said inclined angle is 45°±15°.

5. The ceramic honeycomb structures as claimed in claim 1, wherein the partitions of said second group of partitions are inclined at an angle of zero degrees against the Y-axis.

6. The ceramic honeycomb structures as claimed in claim 1, wherein said second group of partitions are inclined at an angle of more than 10° against the Y-axis.

7. The ceramic honeycomb structures as claimed in claim 6, wherein said inclined angle is 45°±10°.

* * * * *